(12) United States Patent
Abe et al.

(10) Patent No.: US 7,260,473 B2
(45) Date of Patent: Aug. 21, 2007

(54) METHOD AND MOBILE STATION FOR ROUTE GUIDANCE

(75) Inventors: Lutz Abe, Erbach (DE); Lutz Schneider, Ulm (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/311,895

(22) PCT Filed: Jun. 18, 2001

(86) PCT No.: PCT/EP01/06853

§ 371 (c)(1),
(2), (4) Date: Mar. 26, 2003

(87) PCT Pub. No.: WO02/01155

PCT Pub. Date: Jan. 3, 2002

(65) Prior Publication Data

US 2003/0158650 A1   Aug. 21, 2003

(30) Foreign Application Priority Data

Jun. 29, 2000   (DE) ................................ 100 30 805

(51) Int. Cl.
   *G01C 21/26* (2006.01)
(52) U.S. Cl. ..................................... 701/200
(58) Field of Classification Search ........ 701/200–202, 701/206–211, 213, 224; 342/357.06, 357.08, 342/357.09, 357.1, 357.13, 457; 340/988–991, 340/993, 995, 996
See application file for complete search history.

(56) References Cited

U.S. PATENT DOCUMENTS 5,270,936 A * 12/1993 Fukushima et al. ......... 701/213
5,565,874 A * 10/1996 Rode ........................... 342/457
5,991,690 A * 11/1999 Murphy ....................... 701/211
6,070,124 A *  5/2000 Nimura et al. .............. 701/211

(Continued)

FOREIGN PATENT DOCUMENTS

DE       198 37 568 A       6/1999

(Continued)

OTHER PUBLICATIONS

The International Search Report for PCT/EP01/06853; Filed Jun. 18, 2001; Date of Completion Dec. 12, 2001; Date of Mailing Dec. 19, 2001.

*Primary Examiner*—Thu V. Nguyen
(74) *Attorney, Agent, or Firm*—Alston & Bird LLP

(57) ABSTRACT

A method of and mobile station for route guidance for a user including a processor and a directional indicator which provides a reference direction, with the mobile station connecting to an on-line service with an electronic database containing geographic information and mobile position. Local position and destination is transmitted to the on-line service to request route guidance data.

The on-line service processes the data as a function of branching of a total route to the user's destination as route sections and transmits a specification of direction and destination name for each route section destination to the mobile station.

The processor processes the specification of direction and reference direction to define a target direction of a current route section destination and displays the target direction and route guidance data of the current route section destination and guidance data of at least one upcoming stage of the route.

32 Claims, 2 Drawing Sheets

U.S. PATENT DOCUMENTS

| | | | |
|---|---|---|---|
| 6,314,365 B1 * | 11/2001 | Smith | 701/200 |
| 6,320,496 B1 * | 11/2001 | Sokoler et al. | 340/407.1 |
| 6,324,468 B1 * | 11/2001 | Meis et al. | 701/202 |
| 2002/0002467 A1 * | 1/2002 | Ho | 705/1 |

FOREIGN PATENT DOCUMENTS

| | | |
|---|---|---|
| EP | 0 810 571 A | 12/1997 |
| JP | 11-072341 * | 3/1999 |
| WO | WO98 45823 A | 10/1998 |

* cited by examiner

METHOD AND MOBILE STATION FOR ROUTE GUIDANCE

BACKGROUND OF THE INVENTION

1. Field of the Invention

The invention relates to a method of route guidance for a person with a mobile station which is connected via a mobile telephone network to a special online service. The on-line service provides geographic information data for route guidance which a person on the move, such as a pedestrian, cyclist or the like, calls up for automatic route guidance to a desired destination. The invention additionally relates to an extension of the technical fittings for a mobile station which corrects the optical and/or acoustic output and utilization of the transmitted information data. Moreover, the invention can also be applied in any type of vehicle. The term "mobile station" describes any mobile device to which a bidirectional connection to a mobile telephone network can be established, for example a mobile telephone for a cellular radio communications network.

2. Description of the Prior Art

What is known as the global positioning system (GPS) is used to guide a vehicle in an unfamiliar region to its destination. If a GPS receiver in the vehicle receives simultaneously at least three GPS satellites the receiver can determine from the propagation delay of the signals its local position exactly to within about 20 m to 100 m. Moreover, by exploiting the Doppler effect in moving vehicles the speed, course and other navigational variables may be determined. Starting from the computed position a dead reckoning navigation unit having appropriate sensors for the motion of the vehicle determines route data on the actual direction of motion and on the distance covered.

Only once a local computer has entered the route data into an electronic map is it possible to relate one's own position to the proximate environment. The computer requires access to a database containing a substantial volume of geographic information in order to select the information for the electronic map in accordance with the desired destination. After the route has been computed this is output by acoustic or optical means.

The application of this system for the provision and detailed volume of data would not be just a problem for the pedestrians and cyclists. For the geographic information alone the computer needs a non-volatile local storage medium having high storage density such as a CD-ROM or hard disk offering a storage capacity of some hundreds of megabytes. Accordingly, the fittings are substantial and costly and due to their volume, weight and energy consumption are not well suited to a mobile station such as a mobile telephone. Over and above that, periodic updating of the information when local change occur has to be ensured.

As an alternative to this the French company Webraska Mobile Technologies SA runs a navigation service on the Internet (http://webraska.com) with a server which substantially possesses a cartographic database and a program for the computation of travel routes. The delivery of this service, in particular the computation of personal travel routes can be requested inter alia by network connection via a mobile station. The technical design of the service is set out in publication WO 98/45823. By means of appropriate textual, graphic and acoustic data entered into his/her mobile station the person transmits information about the desired destination to the server. The mobile station also has a positioning device, such as for example the aforementioned GPS receiver, and determines its own local position automatically. Alternatively, a known GSM network positioning facility can be used which calculates the current position on the basis of distances to nearby base stations in the mobile communications network. However, the data on the starting position can also be entered by the person him-/herself in the form of text and/or graphics or acoustically.

After receiving the position and destination data the navigation service computes a corresponding personal travel route and transmits this to the mobile station as route coordinates in vector form during a transmission period. That means the entire distance is transmitted as a series of coordinates for route segments so that the geometric pattern of the route is stored temporarily by means of coordinates in the mobile station and can be illustrated on a mobile station display by means of straight route segments and curved segments.

The wireless data interchange between the mobile station and the navigation service ensues in accordance with the Internet telecommunications application WAP=wireless application protocol. This is optimized for use in wireless data communications and instead of transmitting complex structured web pages transmits only text and simple graphics.

The positioning device periodically determines the current position of the mobile station and a microcomputer compares this with the local route coordinates on the transmitted travel route. In this way constant route guidance including display of the current position in a map is possible in real time and the microcomputer can immediately identify and output departures from the travel route. In order to avoid the person having to constantly observe the graphic display there is the possibility of indicating a forthcoming change of route direction by means of additional acoustic or optical outputs, for example in a mobile telephone by lower image resolution. The solution, however, imposes lower requirements on the local equipment with regard to the computer and storage capacity than other navigation systems so that route guidance for pedestrians and cyclists can be implemented. In all of the embodiments described the microcomputer is continuously making comparisons regardless of the complexity of the course of the travel route, for example at intervals of seconds, between the current local positional data and the route coordinates of the computed travel route. This is disadvantageous as was also the case for the solution described at the outset. If the mobile station moves for a relatively long time on the same road or the same route the computer and positioning device are carrying out many redundant activities which drain the battery power supply without the accuracy of the route guidance rising. This is a particularly unsatisfactory state in the case of a mobile telephone having a compact power supply.

Moreover, as a consequence of the detailed presentation of the travel route for all roads or routes not running in a straight line the route coordinates for several route segments are transmitted. This increases the cost of data transmission to the mobile station. As a result of the limited transmission bandwidth of the mobile communications network, however, only a small volume of data can be transmitted in an acceptable time so that redundancy in the data volumes should be avoided. Moreover, only a limited amount of energy is available to a user without a vehicle for determining the route.

All of the aforementioned solutions require GPS signals in each time interval simultaneously from at least three GPS satellites. This assumes constant good reception of these satellites and is difficult to ensure particularly in densely built-up areas. In the event of defective reception errors occur in the route guidance, particularly in regions in which the direction of motion towards the destination changes at short intervals.

Numerous publications disclose the use of electronic compass sensors for navigation purposes. The company Precision Navigation, Inc., Canada, for example, manufactures such sensors. Instead of rotatably mounted magnetic needle such modules use two inductors oriented at right angles to one another in order using the earth's magnetic field to determine the orientation of a device relative to the points of the compass. In a computation process the orientation can be calculated directly in degrees. Accuracies of less than 5° can be achieved at low cost and with comparatively little effort

SUMMARY OF THE INVENTION

The invention, on the one hand, provides a method with none or little or no additional cost for equipping a mobile station for low energy consumption and for low transmission capacity a route guidance system having a mobile station and a communications link to an on-line service, in particular for pedestrians, is possible. On the other hand, the invention extends the technical fittings of a conventional mobile station at low additional cost in such a way that the user can be guided conveniently from a starting point to a destination.

The solution according to the invention is based on the idea that neither geographical route information nor means for defining the local position are present in the mobile station. Accordingly, the user conducts a dialogue via the mobile station with the on-line service in order to transmit information on his/her current local position and his/her desired destination. The on-line service uses geographic information from a database in order to determine the positional data for the current position and the desired destination, computes a personal travel route and transmits corresponding route data to the mobile station.

In contrast with the known solution the on-line service preprocesses the route data in the form of a series of stages of the route having discrete route destinations. The route destinations serve to orient the user and depend on prominent points on the route, in particular on branching of the route to the user's destination. As the minimum data for each stage the on-line service transmits in each case only a specified direction and the designation of the route destination. Prominent points on the route for discrete route destinations are in particular branching points on the travel route which require, for example, leaving a road used so far, crossing a square or even passing landmarks, memorials and public buildings. At route destinations the user usually selects a new route direction. The mobile station outputs the received route data for each route destination optically and/or acoustically as a destination direction and destination name. Once the user has reached his/her current route destination by entering confirmation into the mobile station he/she requests output of the following route destination.

The present invention makes use of the knowledge that for guiding a person to a destination it is not absolutely necessary to constantly trace one's own path in a map against the surroundings of the route travelled nor is other information in line with scale on the course of the travel route needed. Sufficiently exact guidance to the destination is possible solely in the starting from his/her current position the user is given an unambiguous specification of direction and the designation of the next route destination. This reduces the transmission capacity for transmitting the route data. If the route runs in non-linear manner because, for example, the road takes a curved course, no additional route destination is needed to be transmitted as long as the travel route does not depart from the road defined as the stage.

Details on the length of path of stages of the route or of the total distance are helpful but not essential if the user receives unambiguous destination names.

Conventional means for dead reckoning navigation can be dispensed with because the mobile station outputs the route data in stepwise manner in the sequence of the stages of the route and only updates the output when the reaching of the current route destination is confirmed.

It is highly advantageous that the user can already start on the way using the current specified destination before transmission of the data for the entire travel route is ended.

According to an advantageous development of the invention the user in a first step establishes a communications link with the mobile station to the on-line the positional and destination information needed for route guidance. The positional data can be determined both in a speech dialogue as well as in a dialogue using written and/or graphical input. Advantageously, however, speech information from the user is compared with geographical information from the database, the local position is defined with the aid of prominent points in the surroundings through targeted interrogation by the on-line service and the corresponding positional data are read out from the database.

The on-line service conducts the speech dialogue either through a person or advantageously using a speech computer. Following a rough statement of the user's position the speech computer selectively generates on the basis of information from the geographical database questions to specify more precisely and qualify the positional and destination data.

According to a further advantageous version of the invention the on-line service obtains information from the mobile communications network operator on the position of the network access point. That is to say it uses the knowledge of the position of the base station of the cell through which the user's mobile station is logged into the mobile communications network in order to discover automatically rough information on the local position of the user.

This has the advantage, especially in a large city having a dense cell network that already without help from the user the zone of the position can be pinned down and the name of the city and district need no longer be enquired about. A question about the name of a street or a square already serves in many cases to pin the position down. A further question for the name of an intersecting or branching street would then define the user's position with sufficient accuracy within a short time. This too is carried out by preference in a speech dialogue on grounds of convenience.

The route data determined by the on-line service can be transmitted in full to the mobile station immediately after it has been generated and then stored temporarily in the mobile station. On the one hand, this shortens the busy time of the transmission channel and hence lowers connection costs. On the other hand, however, this requires additional free memory capacity in the mobile station.

In order to be independent of the level of technical fittings in the mobile station, as an alternative to this the on-line service can also advantageously store the route data temporarily and transmit it in stepwise manner in the sequence of the stages of the route. Once the user has reached his/her current route destination, by inputting a confirmation into the mobile station he/she calls for the route data for the following route destination from the on-line service. The on-line service transmits corresponding route data and the mobile station overwrites the previous contents of the memory.

In addition to the known functional elements for carrying out telecommunications, the mobile station according to the invention has a directional indicator which provides direction data in accordance with the orientation of the mobile station relative to the points of the compass in order to define a target direction to the current route destination at any time. A processor, which is already present in each mobile station, compares the directional data with the route data which contain the specification of direction for the current stage.

Depending on the construction of the invention at least one output part signals optically and/or acoustically a departure from the present orientation of the mobile station from the target direction. As an alternative to this an output part outputs optically and/or acoustically together with the name of the current destination a target direction related to the orientation of the mobile station. For this purpose the optical and/or acoustic output components present in the mobile station are preferably used. In the case of acoustic output a simple sound signal or speech can be output.

By using the directional indicator a decisive disadvantage of route guidance devices using a GPS receiver is avoided. These can only recognize the direction of movement of the user once the latter has possibly moved in the false direction. In the solution according to the invention, however, the correct target direction is already output together with the first route destination.

Optical output of the target direction and destination name has the advantage of being readily perceptible even at high noise levels, as is the case, for example, on streets with traffic. Acoustic output, speech output for example, is advantageous at twilight or for people who have difficulty making out optical displays.

In order to allow unambiguous guidance of the user with the aid of the target direction and destination name the mobile station possesses a program advance circuit. On reaching the current route destination this is actuated in order to update the output.

BRIEF DESCRIPTION OF THE DRAWINGS

An exemplified embodiment of the subject matter of the invention is illustrated in the drawings. These show:

FIG. 2 is a block diagram for access of the mobile station to the on-line service and FIGS. 3a-4b are examples for the optical output of route data for the computed travel route.

DETAILED DESCRIPTION OF THE INVENTION

Figure 1:
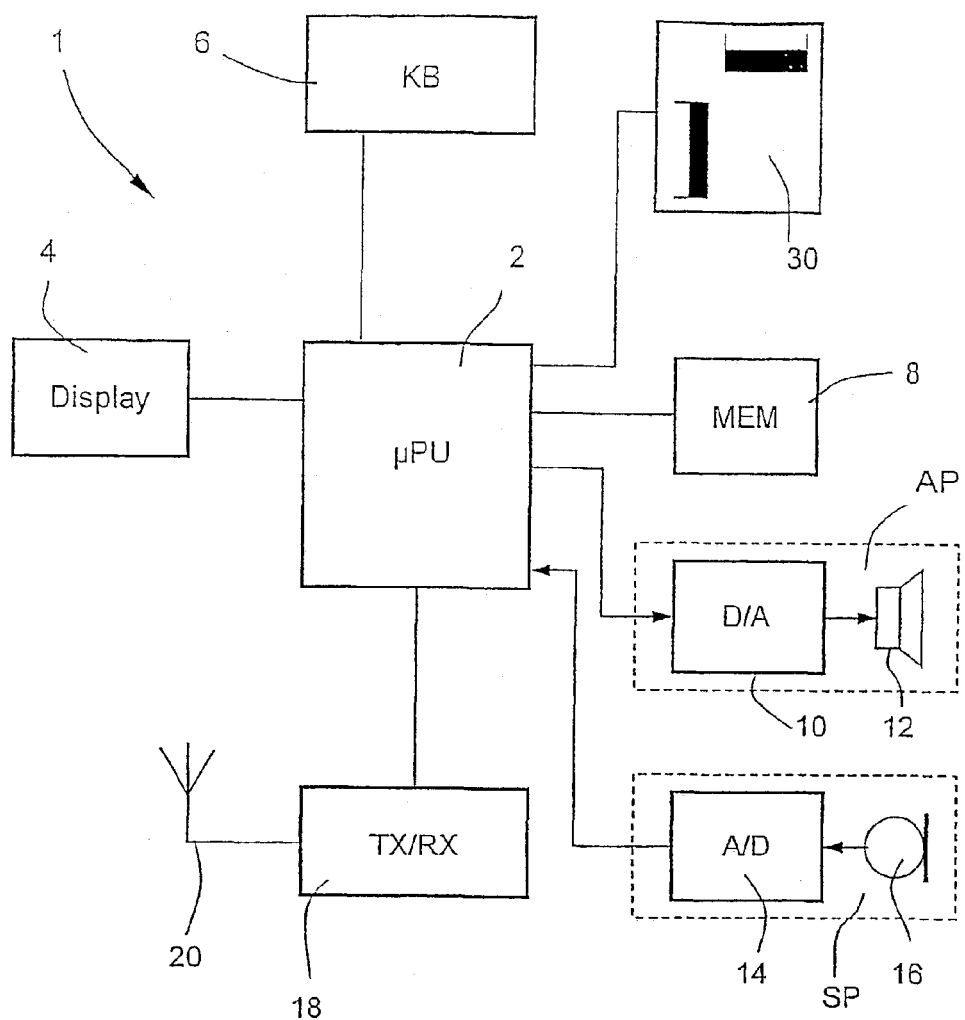
FIG. 1 is a block diagram of the mobile station according to the invention.

FIG. 1 shows a block diagram having essential functional elements in a mobile station 1. The mobile station 1 has a processor 2 to which for the optical output of information a display 4, e.g. a liquid crystal display having a dot matrix, and a keyboard 6 are connected. In practice, depending on the design of the mobile station 1 the processor 2 can be formed of a single processor or from several connected processors. The mobile station 1 implements in real time operation the known telecommunications functions and possesses storage means such as a memory 8 for the temporary storage of data. All temporary data arising from an existing network connection such as additional information or information on value-added services received over the network are stored in this memory. Further connected to the processor 2 are an audio reproduction branch AP containing a digital-analog converter 10 and a loudspeaker 12 and a microphone branch SP containing an analog-digital converter 14 and a microphone 16. The audio reproduction branch AP outputs acoustically telephone conversations and information for value-added services. A HF transceiver 18 having an antenna 20 establishes the communications link to a mobile communications network NET.

The structure described so far corresponds to that of a conventional mobile telephone.

Figure 2:
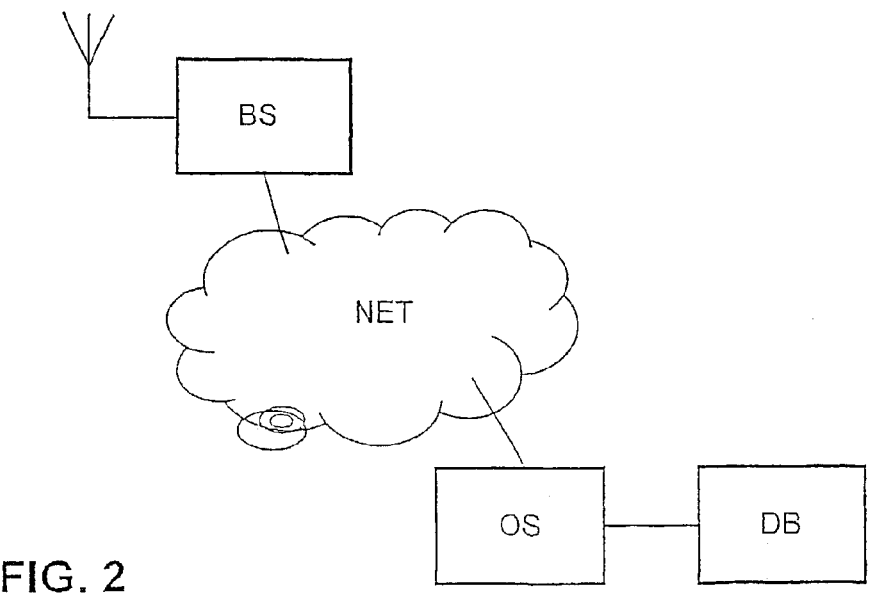

FIG. 2 shows the access to the mobile communications network NET via a network access point BS which in the present case is a base station of a cellular communications network 2.

For the transmission protocol between the mobile station 1 and the base station BS what is known as the "wireless application protocol" or a different Internet communications protocol for a mobile station can be used. The connection then leads, for example, via a protocol converter known as a "WAP gateway" to a server of an on-line service (OS). The on-line-service (OS) is connected to the database which contains comprehensive geographic information.

For the medium between the mobile station 1 and the base station what is known as the "general packet radio system" GPRS also comes into consideration for future use. This carrier service is known for data transmission at higher data rates between a mobile telephone and a mobile communications network. The known "circuit switched data" CSD is also suitable.

Figure 3:
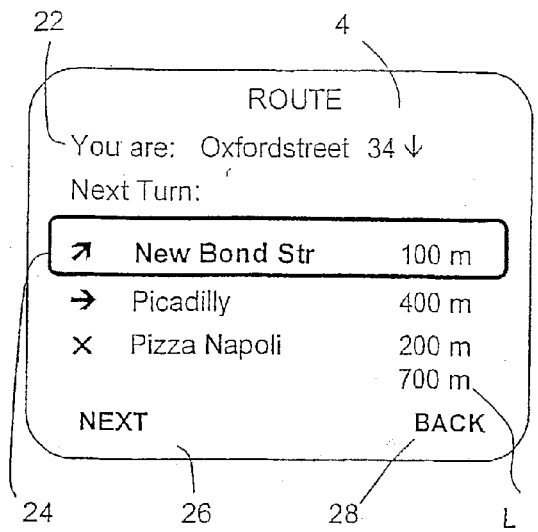
Figure 3:
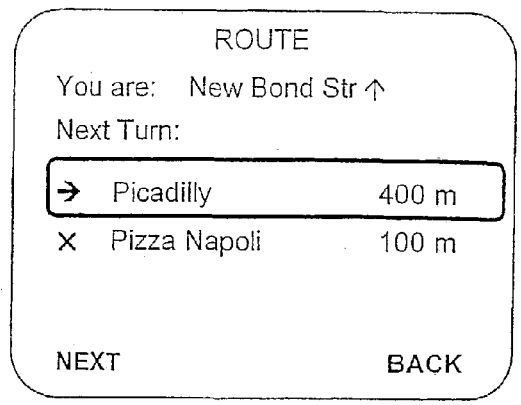

FIGS. 3a and 3b show the optical presentation of the transmitted route data on the display 4 according to a simple embodiment of the invention. In this application the mobile station can be a mobile telephone with conventional fittings. The display 4 contains exclusively information in the form of individual characters. In a position line 22 is the designation of the starting position for the current stage. In the present example these are the street name and the number of the house at which the user is standing at the beginning of route guidance. The downward pointing arrow indicates that the user on "Oxfordstreet" must move in the direction of lower house numbers in order to reach his/her current route destination. In this manner in the present example a specification of direction for the first route destination is achieved. In a destination line 24 the display 4 additionally shows the name of the current route destination, in the example the branching of "New Bond Street" from "Oxfordstreet", that is to say the point on the way at which the route reaches a branching point and a change of direction is needed. In front of the name of the current route destination there is an arrow to specify the new direction. In the present case the new target direction is about 135° to the right with reference to the present one. Under the destination line 24 there are details about the following stages of the route.

Advantageously the paths of the stages of the route are supplemented by distance information. This supports the route guidance and provides information about the length L of the total travel route. The lower edge of the display 4 provides information 26 and 28 on the current effects of the corresponding functional keys on the mobile station. On reaching a route destination the functional key 26, for example, is actuated in order to update the information in the display 4 as shown in FIG. 3b for the following route destination.

In the special embodiment of the invention according to FIG. 1 in addition to the named standard functional units 2 to 20 the mobile station 1 contains a directional indicator 30, for example a magnetic compass or preferably an electronic compass sensor as was described in the introduction. The use of a magnetic compass having a mechanical display certainly has the advantage that it requires no energy and calibration to operate. However, attribution of a specified direction transmitted by the on-line service is relatively difficult.

An electronic compass sensor, on the other hand, supplies data to the processor 2 on the current orientation of the principal axis of the mobile station 1 as a function of the earth's magnetic field. An internally stored application program calculates from the transmitted specification of direction and the data on the current orientation the actual target direction to the route destination for optical and/or acoustic output.

Advantageously the mobile station 1 also possesses means which indicate to the user a departure of the operating position from the horizontal in which the directional indicator 30 operates defectively.

Figure 4:
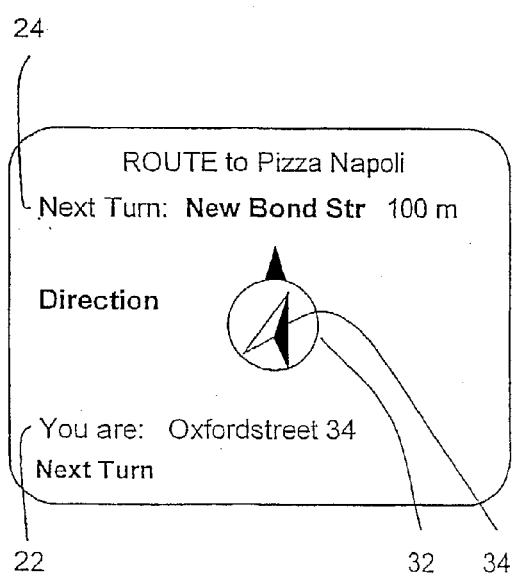
Figure 4:
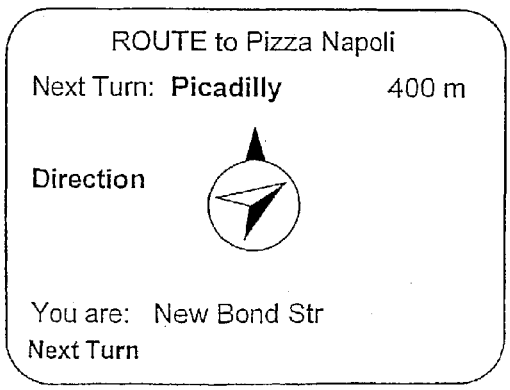

FIGS. 4a and 4b show a optical display of transmitted information prepared by the processor 2 with inclusion of the directional indicator 30. A optical display of direction 32 shows the user by means of a directional arrow 34 the target direction of the current route destination in the destination line 24 which the processor 2 has computed from the specified destination in the route data and the sensor data of the direction indicator 30 on the current orientation of the mobile station. The direction display 32 itself has a frame with a fixed direction arrow which coincides with the principal axis of the mobile station. This is important, for example, when the shape of the housing of the mobile station departs distinctly from, the shape of a conventional mobile telephone. The mobile station is pointing at the route destination when the fixed direction arrow and the direction display 32 are pointing in the same direction.

At the same time the display 4 shows in the position line 22 the starting point, that is to say the start of the current state.

For example, the user is located in Oxford Street in front of house number 34 and would like to go to a restaurant "Pizza Napoli". Once he/she has established a connection to the on-line service OS, an operator of the on-line service OS acquires both the positional data as well as the destination data. In doing so the operator uses an exact geographic description of the location in the database DB. A server of the on-line service OS computes the travel route and transmits the corresponding data automatically to the mobile-station 1.

The mobile station 1 files the received route data in the memory 8. Since the travel route is made up of a series of route destinations, the processor 2 first of all calls up from the memory 15 the data for the first route destination. In the example chosen the first route destination is in Oxford Street, 100 m from the current position and, for example, presents a junction or intersection with New Bond Street. In addition, the processor 2 uses the direction data from the directional indicator 30 in order to identify the orientation of the principal axis of the mobile station 1. On the basis of the route data and the orientation, the processor 2 determines the target direction to the current route destination and indicates this in the display 4 by means of the direction symbol 34. That is to say, regardless of the orientation of the mobile station 1 in the horizontal plane the direction symbol 34 always points in the correct direction. Furthermore, the processor 2 outputs the current destination name for the current route destination in the destination line 24.

If the memory contains no more route destinations route guidance is terminated automatically.

According to a development of the invention, it is also possible to output the information about the travel route acoustically, for example via the audio reproduction branch AP in the mobile station 1.

The user can also communicate arrival at a route destination to the mobile station 1 acoustically via speech input through the microphone branch SP. In doing so a speech recognition program serves the processor 2 to recognize and process the speech.

For interchange between the mobile station and the on-line service OS, it is not essential in the method according to the invention to use a speech channel. Transmission is possible on any transmission channel for what are known as value-added service WAS).

The solution according to the invention has the substantial advantage that it can be implemented with a minimum of additional expense and volumetric capacity in a mobile station. Iii the simplest case the minimum requirement for carrying out the invention is a conventional mobile station having a WAP protocol installation.

The invention claimed is:

1. A method of route guidance for a user using a mobile station including a processor and a directional indicator which provides a reference direction of the mobile station, the mobile station connecting the user to an on-line service which has access to an electronic database containing geographic information, the method comprising:

transmitting information of a user's local position and the user's destination from the user's mobile station to the on-line service to request route guidance data for route guidance of the user;

processing at the on-line service the route guidance data as a function of branching of a total route to the user's destination as a series of route sections with route section destinations;

transmitting for each route section a specification of a direction and a destination name for the route section destination from the on-line service to the mobile station to identify each route section;

the processor processing the specification of direction and the reference direction to define a target direction of a current route section destination; and displaying, by the mobile station, from a starting position for a current route section the target direction of the current route section destination, route guidance data of the current route section destination, and guidance data of only one upcoming route section of the route out of a route list, wherein the route guidance data additionally includes information about a direction relating to a sequence of house numbers; and updating the display upon reaching the current route section destination in that the current route section destination forms the starting position for a next route section.

2. A method in accordance with claim 1 wherein:

the directional indicator is a compass which is associated with the mobile station; directional data is provided in accordance with an orientation of the mobile station relative to points of the compass;

the directional data are compared by a processor with the route guidance data which specify a direction of the current route section; and at least one component of the route guidance data signals any deviation of a current orientation of the mobile station from the target direction.

3. A method according to claim 2, wherein:
the route data additionally contains information about distance of the at least one of the route sections and distance of the entire route.

4. A method according to claim 2, wherein:
the mobile station outputs the route guidance data in a sequence of the route sections of the route with corresponding specifications of direction and destination names and the user confirms reaching of a current destination of a route section with an input to the mobile station in order to update output of route guidance data.

5. A method according to claim 2, wherein:
the on-line service transmits the route guidance data in a sequence of the route sections so that the user can move towards a first route destination during transmission of the route guidance data.

6. A method according to claim 2, wherein:
the on-line service stores the route guidance data and the user upon reaching a current route destination requests transmission of the route guidance data for at least one following route section from the on-line service by means of an input into the mobile station.

7. A method according to claim 2, wherein:
the on-line service conducts a dialogue with the user via a cellular communications network, a network access point and the mobile station, with support of the database, to determine positional data and destination data for a current location of the user and for a desired destination of the user.

8. A method according to claim 7, wherein:
the on-line service has information about a location of the network access point in the communications network and uses the information in the dialogue for a determination of position of the user.

9. A method according to claim 7, wherein:
an automatic speech recognition system controls the dialogue for determination of the positional data and the destination data.

10. A method in accordance with claim 1 wherein:
the directional indicator is a compass which is associated with the mobile station;
directional data is provided in accordance with an orientation of the mobile station relative to points of the compass;
the processor determines a deviation in orientation of the mobile station from a current specification of direction; and
the target direction relative to the orientation of the mobile station together with the destination name of the current route section destination is outputted by the mobile station.

11. A method according to claim 10, wherein:
the on-line service stores the route guidance data and the user upon reaching a current route destination requests transmission of the route guidance data for at least one following route section from the on-line service by means of an input into the mobile station.

12. A method according to claim 10, wherein:
the route guidance data contains information about distance of the at least one of the route sections and distance of the entire route.

13. A method according to claim 10, wherein:
the mobile station outputs the route guidance data in a sequence of the route sections with corresponding specifications of direction and destination names and the user confirms reaching of a current destination of a route section with an input to the mobile station in order to update output of the route guidance data.

14. A method according to claim 10, wherein:
the on-line service transmits the route guidance data in a sequence of the route sections so that the user can move towards a first route destination during transmission of the route guidance data.

15. A method according to claim 10, wherein:
the on-line service conducts a dialogue with the user via a cellular communications network, a network access point and the mobile station, with support of the database, to determine positional data and destination data for a current location of the user and for a desired destination of the user.

16. A method according to claim 15, wherein:
the on-line service has information about a location of the network access point in the communications network and uses the information in the dialogue for a determination of the current location of the user.

17. A method according to claim 15, wherein: an automatic speech recognition system controls the dialogue for determination of the positional data and the destination data.

18. A method according to claim 1, wherein: the route guidance data contains information about distance of the at least one of the route sections of the route and distance of the entire route.

19. A method according to claim 1, wherein: the mobile station outputs the route guidance data in a sequence of route sections of the route with corresponding specifications of direction and destination names and the user confirms reaching of a current destination of a route section with an input to the mobile station in order to update output of the route guidance data.

20. A method according to claim 1, wherein: the on-line service transmits the route guidance data in a sequence of the sections of the route so that the user can move towards a first route destination during transmission of the route guidance data.

21. A method according to claim 1, wherein:
the on line service conducts a dialogue with the user via a cellular communications network, a network access point and the mobile station, with support of the database, to determine positional data and destination data for a current location of the user and for a desired destination of the user.

22. A method according to claim 21, wherein:
the on-line service has information about a location of the network access point in the communications network and uses the information in the dialogue for a determination of the current location of the user.

23. A method according to claim 21, wherein: an automatic speech recognition system controls the dialogue for the determination of the positional data and the destination data.

24. A method according to claim 1, wherein: the route guidance data is transmitted on a data carrier channel which is provided for transmission of data for value-added services.

25. A method according to claim 1, wherein guidance data for a plurality of at least one upcoming route section of the route is displayed.

26. A mobile station for guiding a user to a destination using an on-line service which, via a wireless connection to a communications network, transmits route data for a travel route of the user including a specification of route data as a function of branching of a total route to a user's destination as a series of route sections with route section destinations with the route sections including a specification of direction, comprising:

a processor, means for storage of the route data, application software which is executed by the processor to output the route data and a direction indicator which provides a reference direction of the mobile station; and wherein the processor processes the specification of direction and the reference direction to define a target direction to a current route section destination, wherein the mobile station comprises means for displaying from a starting position for a current route section the target direction of the current route section destination, route guidance data of the current route section destination, and guidance data of only one upcoming route section of the route out of a route list, wherein the route guidance data additionally includes information about a direction relating to a sequence of house numbers;

wherein the mobile station further comprises means for updating the display upon reaching the current route section destination in that the current route section destination forms the starting position for a next route section.

27. A mobile station according to claim 26, wherein:
the direction indicator is a compass and generates directional data for the processor in accordance with an orientation of the mobile station relative to the points of the compass and the processor compares the directional data with a specification of a direction contained in the route data for a current route destination and signals any departure of a present orientation of the mobile station from the target direction via at least one output.

28. A mobile station according to claim 26, wherein:
the direction indicator generates directional data for the processor in accordance with an orientation of the mobile station and the processor output a current specification of direction contained in the route data taking into account a present orientation of the mobile station as the target direction relative to a current route destination together with a current destination name.

29. A mobile station according to claim 26, wherein:
the user updates output of the route data on reaching a route destination with a program.

30. A mobile station according to claim 26 wherein:
on reaching a route destination, the user connects to the communications network for the on-line service in order to call up data for other route destinations.

31. A mobile station according to claim 26, wherein:
the mobile station is a mobile telephone.

32. A mobile station according to claim 26, wherein guidance data for a plurality of at least one upcoming route section of the route is displayed.

* * * * *

UNITED STATES PATENT AND TRADEMARK OFFICE
CERTIFICATE OF CORRECTION

| | | |
|---|---|---|
| PATENT NO. | : 7,260,473 B2 | Page 1 of 1 |
| APPLICATION NO. | : 10/311895 | |
| DATED | : August 21, 2007 | |
| INVENTOR(S) | : Abe et al. | |

It is certified that error appears in the above-identified patent and that said Letters Patent is hereby corrected as shown below:

<u>Column 7,</u>

Line 39, "state" should read --stage--.

<u>Column 12,</u>

Line 10, "output" should read --outputs--.

Signed and Sealed this

Eighteenth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,260,473 B2  Page 1 of 1
APPLICATION NO. : 10/311895
DATED : August 21, 2007
INVENTOR(S) : Abe et al.

It is certified that error appears in the above-identified patent and that said Letters Patent is hereby corrected as shown below:

Column 7,

Line 39, "state" should read --stage--.

Column 12,

Line 10, "output" should read --outputs--.

Signed and Sealed this

Fifteenth Day of January, 2008

JON W. DUDAS
*Director of the United States Patent and Trademark Office*